(12) United States Patent
Vihriala

(10) Patent No.: US 8,321,735 B2
(45) Date of Patent: Nov. 27, 2012

(54) JOINT CHANNEL CODE FOR DATA NON-ASSOCIATED CONTROL SIGNALLING TYPE

(75) Inventor: Jaakko Vihriala, Oulu (FI)

(73) Assignee: Nokia Siemens Networks Oy, Espo (FI)

( * ) Notice: Subject to any disclaimer, the term of this patent is extended or adjusted under 35 U.S.C. 154(b) by 968 days.

(21) Appl. No.: 12/290,593

(22) Filed: Oct. 30, 2008

(65) Prior Publication Data

US 2009/0113268 A1  Apr. 30, 2009

Related U.S. Application Data

(60) Provisional application No. 61/001,130, filed on Oct. 30, 2007.

(51) Int. Cl.
 *G08C 25/02* (2006.01)
(52) U.S. Cl. ........................... 714/748; 714/749
(58) Field of Classification Search ............ 714/748, 714/749
 See application file for complete search history.

(56) References Cited

U.S. PATENT DOCUMENTS

| | | | | |
|---|---|---|---|---|
| 7,539,207 | B2* | 5/2009 | Frederiksen et al. | 370/465 |
| 7,916,775 | B2* | 3/2011 | Kim et al. | 375/220 |
| 7,929,415 | B2* | 4/2011 | Kwak et al. | 370/208 |
| 2007/0171849 | A1* | 7/2007 | Zhang et al. | 370/310 |
| 2008/0075184 | A1* | 3/2008 | Muharemovic et al. | 375/260 |
| 2008/0080560 | A1* | 4/2008 | Inoue et al. | 370/491 |
| 2008/0232449 | A1* | 9/2008 | Khan et al. | 375/220 |
| 2008/0268785 | A1* | 10/2008 | McCoy et al. | 455/67.11 |

* cited by examiner

*Primary Examiner* — Philip Guyton
(74) *Attorney, Agent, or Firm* — Harrington & Smith

(57) ABSTRACT

A length $N_d \geq 2$ of a vector is determined, the vector indicating a type of data non-associated control signaling (e.g., CQI+ACK, CQI+NACK, or CQI-only). The length $N_d$ may be sent individually to UEs or broadcast in the cell. The network decodes a received message using a sub-code word from its memory having the determined length $N_d$. From the sub-code word the network determines what type of data non-associated control signaling is in the received message, and may jointly decode CQI and the ACK/NACK. Varying the length $N_d$ achieves an error performance: longer $N_d$ deteriorates CQI performance and increases ACK/NACK performance. The UE receives the indication of the length $N_d$, determines a channel quality vector and also a type-vector from its memory having the length $N_d$, and multiplexes and jointly encodes the vector of length $N_d$ with the channel quality vector.

23 Claims, 6 Drawing Sheets

| DTX/ACK/NACK SYMBOL FOR $N_d=3$ | DTX/ACK/NACK SUB-CODE OUTPUT |
|---|---|
| DTX | 000 |
| ACK | 011 |
| NACK | 110 |
| DTX/ACK/NACK SYMBOL FOR $N_d=6$ | DTX/ACK/NACK SUB-CODE OUTPUT |
| DTX | 111111 |
| ACK | 110000 |
| NACK | 001100 |
| DTX/ACK/NACK SYMBOL FOR $N_d=7$ | DTX/ACK/NACK SUB-CODE OUTPUT |
| DTX | 1111110 |
| ACK | 1110001 |
| NACK | 0001111 |

FIG.3

| DTX/ACK/NACK SYMBOL FOR $N_d=6$ | DTX/ACK/NACK SUB-CODE OUTPUT |
|---|---|
| DTX | 000000 |
| ACK ACK | 001111 |
| ACK NACK | 111110 |
| NACK ACK | 111001 |
| NACK NACK | 100101 |
| DTX/ACK/NACK SYMBOL FOR $N_d=9$ | DTX/ACK/NACK SUB-CODE OUTPUT |
| DTX | 000000000 |
| ACK ACK | 000011111 |
| ACK NACK | 111111110 |
| NACK ACK | 111011001 |
| NACK NACK | 110100101 |
| DTX/ACK/NACK SYMBOL FOR $N_d=11$ | DTX/ACK/NACK SUB-CODE OUTPUT |
| DTX | 00000000000 |
| ACK ACK | 00001111111 |
| ACK NACK | 11111111100 |
| NACK ACK | 11101100011 |
| NACK NACK | 11010011011 |

FIG.4

| $N_d$ | GENERATOR MATRIX G |
|---|---|
| 3 | 10000000001110111110;<br>01000000000100001001;<br>00100000001110111110;<br>00010000110011010101;<br>00001000011101010011;<br>00000100111100110100;<br>00000010101001011110;<br>00000001100111110010; |
| 6 | 10000000000100010011;<br>01000000000001011111;<br>00100000000100101100;<br>00010000000011100110;<br>00001000000111000100;<br>00000100000001101101;<br>00000010000111010010;<br>00000001000111111000;<br>00000000100111001001;<br>00000000010101100111;<br>00000000001010011100; |
| 7 | 10000000000011010010;<br>01000000000001000111;<br>00100000000010000110;<br>00010000000000110110;<br>00001000000011111101;<br>00000100000011001101;<br>00000010000000011010;<br>00000001000001101010;<br>00000000100010110011;<br>00000000010010101110;<br>00000000001011011110;<br>00000000000110001011; |

FIG.5

JOINT CHANNEL CODE FOR DATA NON-ASSOCIATED CONTROL SIGNALLING TYPE

CROSS-REFERENCE TO RELATED APPLICATION

This patent application claims priority under 35 U.S.C. §119(e) from U.S. Provisional Patent Application No. 61/001,130, filed Oct. 30, 2007, the disclosure of which is incorporated by reference herein in its entirety.

TECHNICAL FIELD

The teachings herein relate generally to wireless networks in which individual terminals report different types of data non-associated control signaling.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations and terms are herewith defined:

ACK/NACK acknowledgement/negative acknowledgement
BER/BLER bit error rate/block error rate
CQI channel quality information
DL downlink
DTX discontinuous transmission (e.g., CQI-only transmission)
E-UTRAN evolved UTRAN
3GPP third generation partnership project
LTE long term evolution of 3GPP
Node B base station or similar network access node
OFDM orthogonal frequency division multiplex
PUCCH physical uplink control channel
SER symbol error rate
UE user equipment (e.g., mobile equipment/station)
UL uplink
UMTS universal mobile telecommunications system
UTRAN UMTS terrestrial radio access network 3GPP is standardizing the long-term evolution (LTE) of the radio-access technology which aims to achieve reduced latency, higher user data rates, improved system capacity and coverage, and reduced cost for the operator. A significant distinction in LTE over prior generation wireless systems is that the base station, termed in LTE as an e-Node B, has much broader latitude in scheduling radio resources in use in its cell, and need coordinate with higher network nodes to a much lesser extent than in older systems. This reduces latency in that the e-Node B can make snap decisions for its own resource allocations. More efficient use of the available resources can be achieved with more information at the e-Node B on which to base those allocation decisions. There is of course a point of diminishing returns wherein additional information reported back to the e-Node B by the mobile stations occupies more bandwidth and resources as control signaling than are saved by the more efficient allocation.

Some of that control signaling is a channel quality indicator CQI that tells conditions of the channel over which a transmission to the mobile station was received, and also acknowledgements (ACK) and negative acknowledgements (NACK) that tell whether the mobile station received and properly decoded control signaling or data that was intended for it. In LTE, these feedbacks are sent by the mobile stations on what is termed the physical uplink control channel PUCCH.

While LTE is not yet finalized, it is currently understood among various groups working to finalize its details that the mobile station is to send is CQI bits and its AKC or NACK bit(s) simultaneously in response to reception on a downlink DL. This enables the e-Node B to perform more accurate forward error correction on the channel over which that DL was sent, the next time the e-Node B uses that same channel, or others in which it might be closely related. It is noted that in LTE at least, ACK/NACK requires a smaller BER than CQI does, and that the ACK/NACK transmission and the CQI-only transmissions have to be separated. CQI may sometimes be sent with uplink data but for the case where it is not (e.g., where the mobile station does not have data in its buffer to transmit or it is not granted uplink resources for data transmissions) it is sent without any accompanying data. These ACK/NACK/CQI-only signals are referred generally as data non-associated control signalling since the mobile station sends them without accompanying user data. The principle of simultaneous transmission of different data non-associated control signalling may also be applicable to other systems; LTE is used only as an example.

A problem arises in that generally there are a number of bits needed for reporting CQI, and only one or two bits are needed for reporting ACK or NACK (in LTE, one bit ACK./NACK is used for BPSK modulation and 2 bits for QPSK modulation). Two solutions are proposed of which the inventor is aware, commented below.

A first proposed solution is that the LTE standard require joint coding of CQI and ACK/NACK. At least two problems are seen in this approach: the ACK/NACK bit error rate BER may be too high if there is no repetition before encoding; and that there is no way to distinguish a transmission having CQI sent with ACK/NACK from a transmission with CQI sent alone.

DTX/ACKNACK modulates a reference sequence (RS) and if ACK/NACK is present, a number of symbols are allocated to ACK/NACK. With this proposed solution, if detection of the DTX/ACKNACK is in error then the CQI decoding is not likely to be successful. Also, performance degrades in the presence of ACK/NACK bit(s) and the applicability of a two-bit ACK/NACK is limited to QPSK modulation and is not seen to carry any further information when BPSK modulation is used. Further, the invention detailed below gives improved performance.

What is needed in the art is a way to simultaneously signal different types of data non-associated control signaling with acceptable performance and without increasing control signaling overhead to a detrimental level.

SUMMARY

In accordance with one exemplary embodiment of the invention is a method that includes determining a length $N_d$ of a vector that indicates a type of data non-associated control signaling, where $N_d$ is an integer at least equal to two. Further in the method is decoding a received message using a sub-code word, stored in a memory, having the determined length N, and determining from the sub-code word what type of data non-associated control signaling is in the received message.

In accordance with another exemplary embodiment of the invention is an apparatus that includes a processor and a decoder. The processor is configured to determine a length $N_d$ of a vector that indicates a type of data non-associated control signaling, where $N_d$ is an integer at least equal to two. The decoder is configured to decode a received message using a sub-code word, stored in a memory, having the determined length $N_d$. The processor is further configured to determine from the sub-code word what type of data non-associated control signaling is in the received message.

In accordance with another exemplary embodiment of the invention is a memory storing a program of computer readable instructions. When executed by a processor, the executed instructions result in actions that include determining a length $N_d$ of a vector that indicates a type of data non-associated control signaling (where $N_d$ is an integer at least equal to two); decoding a received message using a sub-code word, stored in a memory, having the determined length $N_d$; and determining from the sub-code word what type of data non-associated control signaling is in the received message.

In accordance with yet another exemplary embodiment of the invention is a method that includes receiving an indication of a length $N_d$ of a vector that indicates a type of data non-associated control signaling, where N is an integer at least equal to two. The method further includes determining a channel quality vector and a vector of the length $N_d$ that indicates a type of data non-associated control signaling, and multiplexing and jointly encoding the vector of length $N_d$ with the channel quality vector.

In accordance with a further exemplary embodiment of the invention is an apparatus that includes a processor and a coder. The processor is configured to determine a channel quality vector and to determine, from a received indication of a length $N_d$, a vector of the length $N_d$ that indicates a type of data non-associated control signaling, where $N_d$ is an integer at least equal to two. The coder is configured to multiplex and jointly encode the vector of length $N_d$ with the channel quality vector.

In accordance with yet a further exemplary embodiment of the invention is a memory storing a program of computer readable instructions. When executed by a processor, the executed instructions result in actions that include receiving an indication of a length $N_d$ of a vector that indicates a type of data non-associated control signaling (where $N_d$ is an integer at least equal to two); determining a channel quality vector and a vector of the length $N_d$ that indicates a type of data non-associated control signaling; and multiplexing and jointly encoding the vector of length $N_d$ with the channel quality vector.

BRIEF DESCRIPTION OF THE DRAWINGS

The foregoing and other aspects of these teachings are made more evident in the following Detailed Description when read in conjunction with the attached Drawing Figures.

FIG. 3 is a table illustrating exemplary DTX/ACK/NACK subcodes for different length $N_d$ for use in the apparatus of FIG. 2.

FIG. 4 is a table illustrating exemplary DTX/ACKACK/ACKNACK/NACKACK/NACKNACK subcodes for different length $N_d$ for use in the apparatus of FIG. 2.

FIG. 5 is a table illustrating exemplary generator matrices for DTX/ACK/NACK subcodes such as those in FIG. 3.

DETAILED DESCRIPTION

As an overview of a particularly advantageous embodiment of the invention, consider that the number of CQI bits to be sent is $N_{CQI}$ and that $N_{CQI}$ is an integer number of bits greater than one. Simultaneous with these $N_{CQI}$ bits are to be sent an ACK if appropriate, a NACK if appropriate, or neither if that is the appropriate response (e.g., the CQI bits are sent in response to some other trigger such as a periodic measurement report). The condition that the CQI bits will be sent alone without an ACK or NACK is termed DTX. There is therefore a ternary (three way) decision as to what is sent with the $N_{CQI}$ bits: DTX, ACK or NACK. This decision is represented as a ternary symbol, $u_{D/A/N}$: {DTX, ACK, NACK}, in which DTX means that the mobile station/UE transmits CQI-only without ACK or NACK, ACK means that it transmits CQI+ACK, and NACK means that it transmits CQI+NACK. Further according to this embodiment, the ternary symbol $u_{D/A/N}$ is encoded into a vector of length $N_d$ bits, which is then multiplexed with a vector ($U_{CQI}$) of length $N_{CQI}$ bits representing the CQI bits. The multiplexed two vectors of lengths $N_d$ and $N_{CQI}$ are then jointly encoded and transmitted. Since the ternary symbol $u_{D/A/N}$ represents a three-way decision, it is at minimum two bits. The vector $N_d$ is therefore a minimum of two bits. As will be detailed below, based on a desired relative error performance between the ternary (for the non-MIMO case) decision symbol $u_{D/A/N}$ which is signaled with a number of bits $N_d$ and the CQI which is signaled with a number of bits $N_{CQI}$, the number of bits for each is dynamically decided by the network by setting the length $N_d$.

Figure 1A:
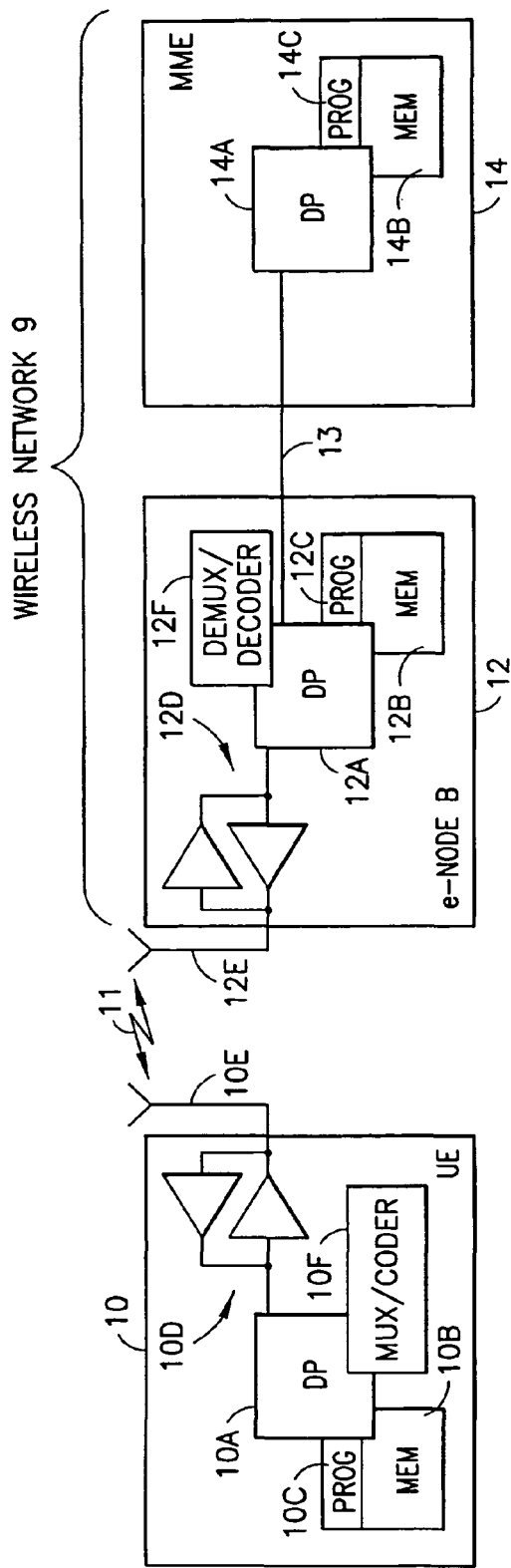
FIGS. 1A-B show simplified block diagrams of various electronic devices that are suitable for use in practicing the exemplary embodiments of this invention.
Figure 2:
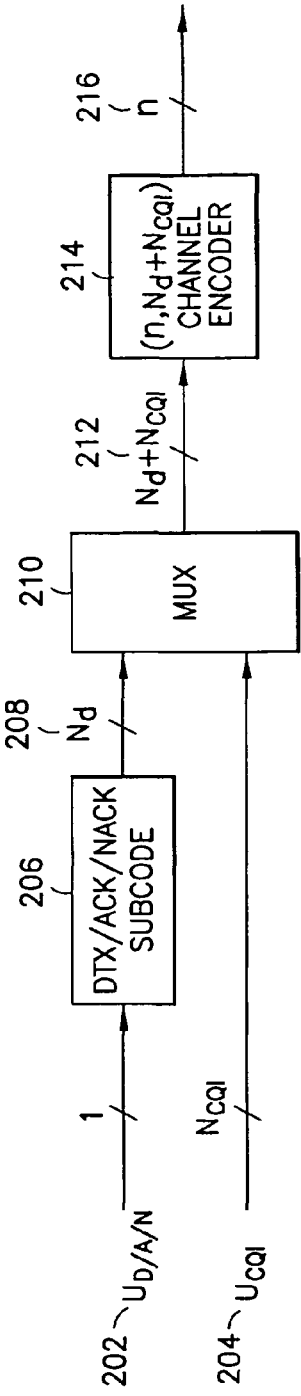
FIG. 2 illustrates further detail of the UE 10 of FIG. 1 according to a particular embodiment of the invention that employs joint coding for DTX/ACK/NACK and CQI.
Figure 1B:
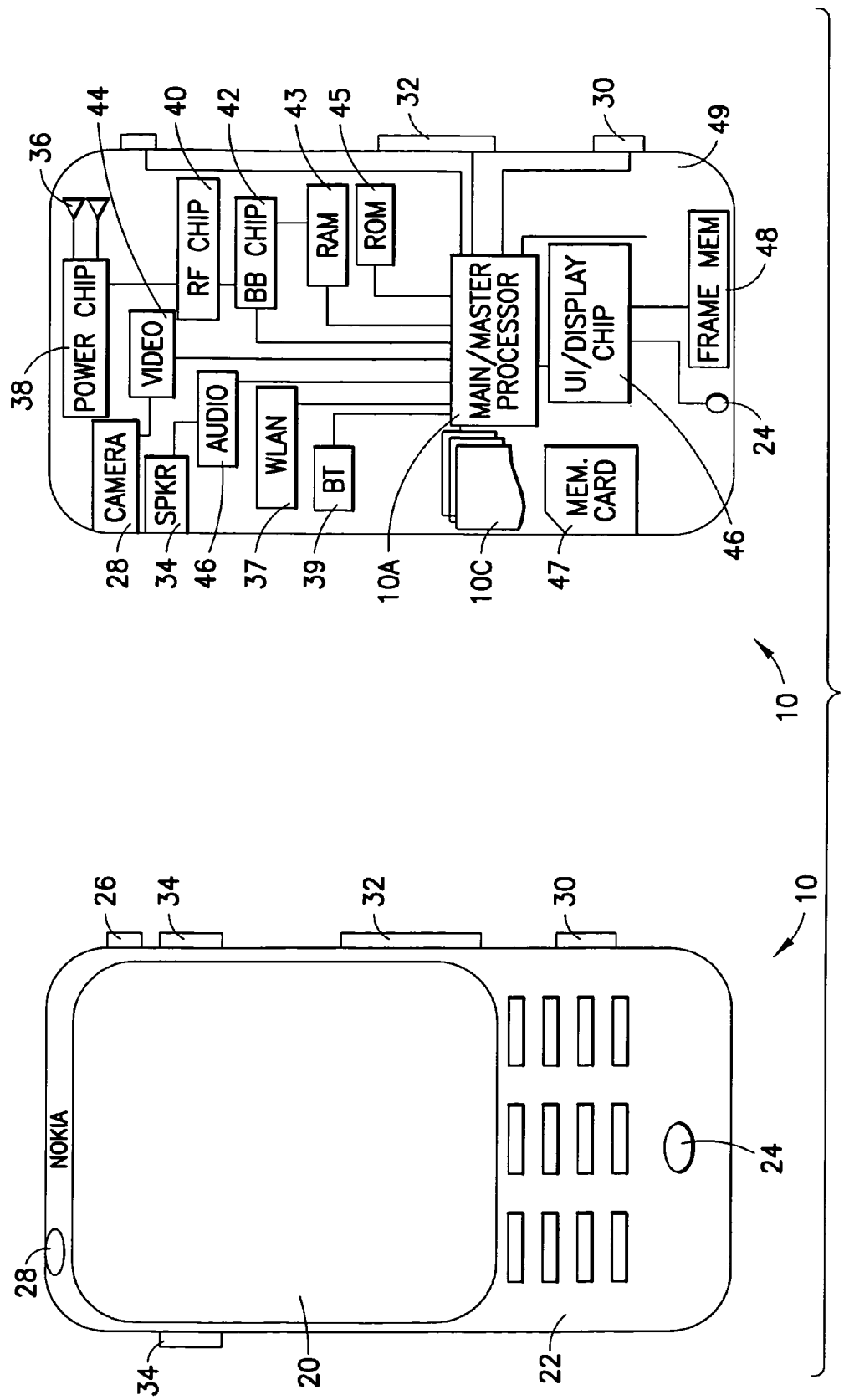

FIG. 2 shows a portion of the UE 10 of FIGS. 1A-B in particular detail to illustrate the general concept of this embodiment, and in an embodiment each of the components of FIG. 2 may be considered as coupled to and controlled by the DP 10A of FIG. 1A. The ternary symbol $u_{D/A/N}$ 202 is mapped at a mapper 206 to a DTX/ACK/NACK subcode of length $N_d$ where each of three instances of the subcode correspond to either DTX, ACK or NACK and the value $N_d$ is greater than a minimum number of bits necessary to represent the ternary symbol $u_{D/A/N}$ 202. For example, if the symbol is ternary as in this example it may be represented by as few as two bits; in that case the minimum value for the length $N_d$ is also two bits. If instead the symbol is binary it may be represented by only one bit; in that instance the minimum value for the length $N_d$ is also one bit. An eight-wise decision symbol could be represented by as few as three bits and so would be encoded to a subcode of minimum length $N_d$ equal to three. In an embodiment where a ternary symbol is being encoded, the subcode length $N_d$ is at least two. The mapper 206 then outputs that subcode of length $N_d$ 208 into a multiplexer 210 in parallel with the symbol $u_{CQI}$ 204 of length $N_{CQI}$ bits. The multiplexed vectors are output from the multiplexer 210 as an interim vector 212 of length ($N_d$+$N_{CQI}$), which is input to an encoder 214 (channel encoder) which encodes it with a codeword of length n and outputs 216 (after modulation and other RF functions carried out in the DP 10A or similar circuitry) to the antenna 10E for transmission over the wireless link 20 after amplification and clipping at the transmitter portion of the transceiver 10D. In this manner both the ternary decision and the CQI information are jointly encoded through the vectors of lengths $N_d$ and $N_{CQI}$.

Determination of the length $N_d$ is detailed below, and it may be broadcast by the e-Node B 12 so that all reporting UEs 10 use the same value, or it may be sent to individual ones of the UEs 10 so that different UEs use different values for $N_d$ for transmissions at the same time within the same cell.

Reference is now made to FIGS. 1A-B for illustrating a simplified block diagram of various electronic devices that are suitable for use in practicing the exemplary embodiments of this invention. In FIG. 1A a wireless network 9 is adapted for communication between a UE 10 and a Node B 12 (in an LTE system termed an e-Node B). The network 9 may include a serving mobility entity MME/gateway GW/radio network controller RNC/14 or other radio network controller function known by various terms in different wireless communication systems. The UE 10 includes a data processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 11 with the Node B 12. The UE 10 also includes a multiplexer/coder 10F as was detailed at FIG. 2.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 12 also includes a DP 12A, a MEM 12B, that stores a PROG 12C, and a suitable RF transceiver 12D coupled to one or more antennas 12E and a demultiplexer/decoder 12F for jointly decoding and demultiplexing the data non-associated control signaling according to these teachings. The Node B 12 may be coupled via a data path 13 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the Node B 12 over the Iub link 13.

Also within the Node B 12 is a scheduler (e.g., a function within the DP 12A) that schedules the various UEs under its control for the various UL and DL subframes. Once scheduled, the Node B sends messages to the UEs with the scheduling grants (typically multiplexing grants for multiple UEs in one message). These grants are sent over the particular channels which may be shared or not in depending upon the specific wireless protocol in which the network 9 operates. Generally, the e-Node B 12 of an LTE system is fairly autonomous in its scheduling and need not coordinate with the MME 14 excepting during handover of one of its UEs 10 to another Node B.

At least one of the PROGs 10C, 12C and 14C is assumed to include program instructions that, when executed by the associated DP, enable the electronic device to operate in accordance with the exemplary embodiments of this invention, as detailed above. Inherent in or coupled to the DPs 10A, 12A, and 14A is a clock to enable synchronism among the various apparatus for transmissions and receptions within the appropriate time intervals and slots required, as the scheduling grants and the granted resources/subframes are time dependent.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the Node B 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

FIG. 1B illustrates further detail of an exemplary UE in both plan view (left) and sectional view (right), and the invention may be embodied in one or some combination of those more function-specific components. At FIG. 1B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 30 which may alternatively function as a volume adjustment for the speaker(s) 34 when the camera 28 is not in an active mode.

Within the sectional view of FIG. 1B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or eNB 12, may operate in a slave relationship to the main processor 10A, 12A, which may then be in a master relationship to them. Embodiments of this invention are most relevant to the baseband chip 42 where the CQI and ACK/NACK are multiplexed and jointly encoded (or the reverse in the eNodeB 12), though it is noted that other embodiments need not be disposed there but may be disposed within the main processor 10A, or across various multiple chips and memories as shown or disposed within another processor that combines some of the functions described above for FIG. 1B. Any or all of these various processors of FIG. 1B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 1B.

Note that the various chips (e.g., 38, 40, 42, etc.) that were described above may be combined into a fewer number than described and, in a most compact case, may all be embodied physically within a single chip.

Returning to more specifics of the invention, the error performance of DTX/ACK/NACK is determined by the length $N_d$: increasing the length $N_d$ improves DTX/ACK/NACK performance and degrades CQI performance. FIG. 3 is a table illustrating an exemplary set of DTX/ACK/NACK sub-codes that may be used for $N_d$=3, 6 and 7. Certainly there are an abundance of other such sub-codes that may be used, but the examples of FIG. 3 are selected to minimize the correlation between the sequences. FIG. 4 shows corresponding generator matrices for systematic linear block codes. These codes have been obtained by computer search, and as with FIG. 3 they are exemplary and not limiting to the scope of these teachings. The channel code can be any channel code and the invention is seen to be compatible with any channel code, such as tail-bitting convolutional codes.

Figure 6:
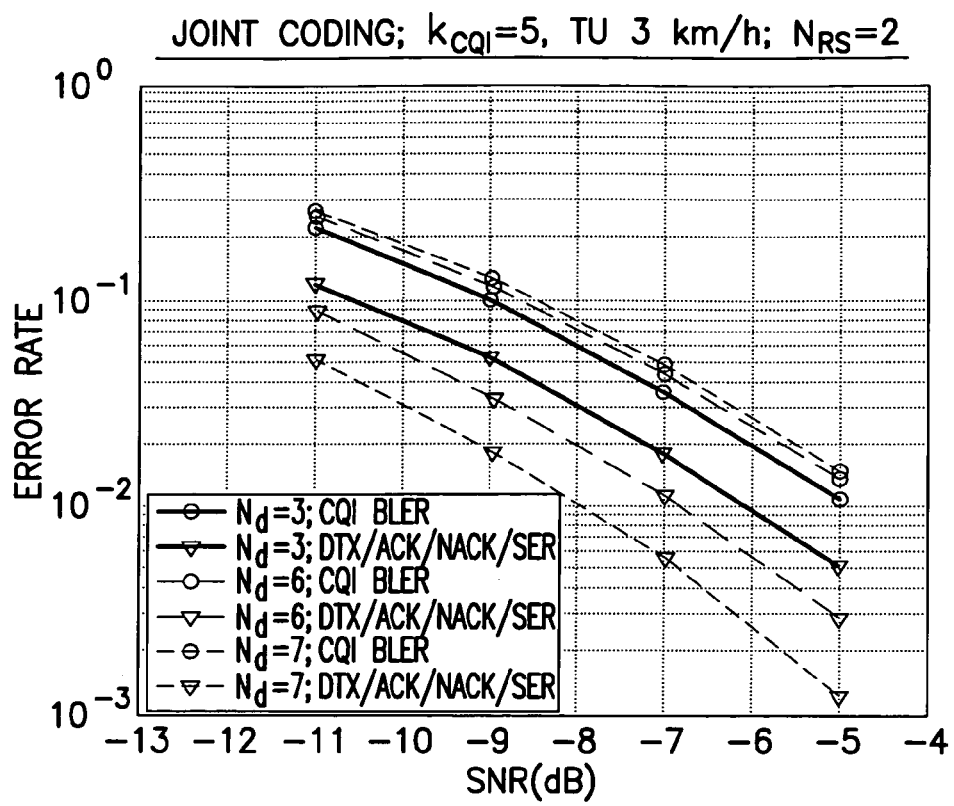
FIG. 6 is a graph of signal to noise ratio SNR versus error rate (BLER or SER) with $N_d$=3, 6 and 7 and $N_{CQI}$=5 in TU fading for an embodiment of the invention.

As a specific example consider that the encoder 214 of FIG. 2 is a block encoder and the code word is length n=20 and the length of the CQI vector is $N_{cqi}$=5. The length n=20 codeword is selected to correspond to two reference sequences in LTE PUCCH, and reference signals in LTE are assumed to be Zhadoff-Chu sequences or other such constant amplitude zero autocorrelation codes (CAZAC). Performance of the embodiment of FIG. 2 is shown at FIG. 6 for $N_d$=3, 6 and 7, which plots CQI block error rate (BLER) and DTX/ACK/NACK symbol error rate (SER). To more clearly delineate the various plot lines, the legend is annotated with letters associated with each plot line in FIG. 6. A typical urban (TU) channel is assumed at 3 km/hr and the number of reference signals $N_{RS}$=2 as above. This clearly shows that when the vector length $N_d$ is increased, performance of the CQI signaling deteriorates and performance of the DRX/ACK/NACK signaling improves.

The above is a simple implementation for reporting a single downlink channel, but LTE and other wireless systems are moving toward multiple input/multiple output MIMO communications where each path between a transmit and a receive antenna constitutes another transmission path. Reporting of these various paths may also prove beneficial for network management purposes, so consider the slightly more complex case of two transmit antennas 12E at the e-Node B 12 and one receive antenna 10E at the UE 10 that achieve two downlink channels as a simple MIMO model. In this case there will be an option for an ACK or NACK for each of those two channels, so there are five different values for the decision vector $u_{D/A/N}$: {DTX, ACK&ACK, ACK&NACK, NACK&ACK, NACK&NACK}. In this set, the first instance of an ACK or NACK refers to one of the downlink MIMO channels and the second instance refers to the other downlink MIMO channel. FIG. 4 is a table similar to FIG. 3 but showing subcode sets for this simple MIMO model for various values of the length $N_d$=6, 9 and 11. As with FIG. 3, these are merely exemplary. Processing within the UE 10 is the same as was detailed above, the difference being that the set of subcodes used for the simple one-transmit/one-receive antenna system may be shorter than those used for a MIMO system. From the above two examples it is clear that this invention may be readily extended to other MIMO systems having more than two downlink channels.

The matter remains how the UE 10 knows what value of $N_d$ to use in a particular system/cell. In a first implementation the value $N_d$ is broadcast by the e-Node B 12 in the cell and all the UEs 10 then operate using the same length $N_d$. In a second implementation the e-Node B 12 sends to individual ones of the UEs 10, in a point to point message for example, a value of $N_d$ to use in that e-Node B's cell. In this manner the network may better tailor performance to the channels the particular UE receivers. In either event, having the e-Node B 12 decide the value of $N_d$, whether that value is cell-wide or individualized to particular UEs 10, the network itself decides the performance for this non-data associated control signaling. If the network prefers low SER for the DRX/ACK/NACK information then it could increase $N_d$. This is beneficial when the network requires an adjustable performance as between the DRX/ACK/NACK and the CQI. That the length $N_d$ is dynamically controlled by the e-Node B 12 enables it to tailor performance to network conditions.

Now the longer $N_d$ carrying only the underlying information of the decision DRX, ACK or NACK (or more varied decisions for MIMO implementations) imposes a slight burden on the e-Node B 12 in its decoding (as compared to signalling only the ternary decision). If the number $N_{CQI}$ of CQI bits is relatively small, say 5 through 10 or thereabouts, the e-Node B 12 can use maximum likelihood decoding to limit its added processing burden and keep time delays minimized. Note that the number of code words is $3*2^{N_{CQI}}$ (or $5*2^{N_{CQI}}$ for five-valued decisions and so on for more MIMO downlink channels). The decoder in the e-Node B 12 (e.g., functionally within the DP 12A) does not need to search all $2^{N_{CQI}+N_d}$ theoretically possible code words.

Figure 7:
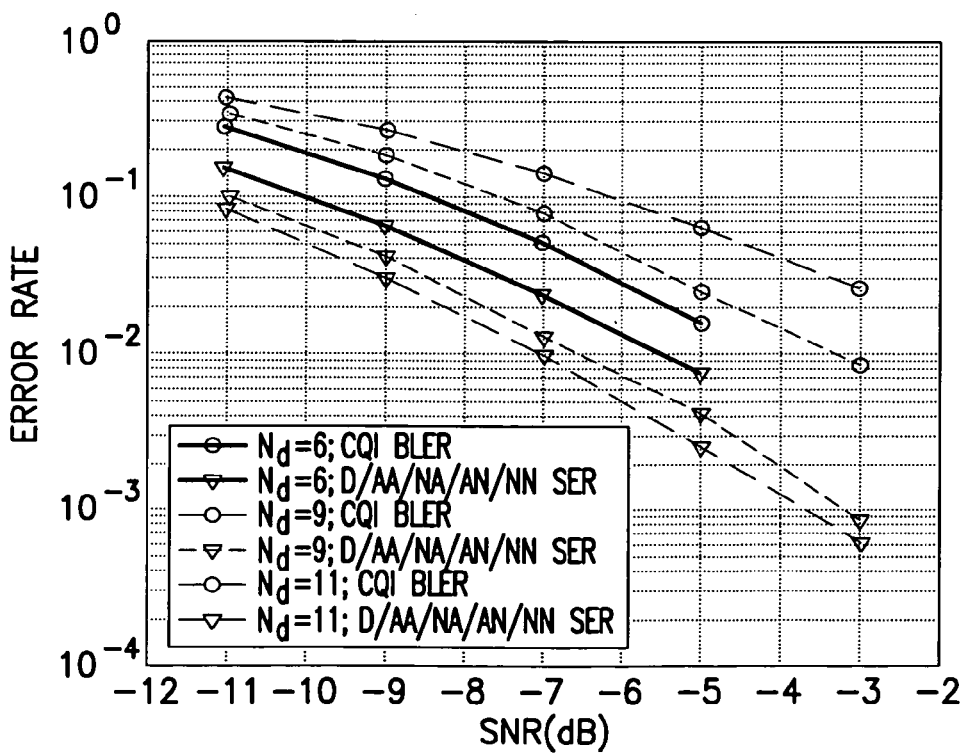
FIG. 7 is similar to FIG. 6 but with $N_d$=6, 9 and 11 and $N_{CQI}$=5 in TU fading.

The improved performance as seen at FIGS. 6-7 are a result of the joint encoding of the CQI bits with the decision vector/sub code of length $N_d$. Embodiments of this invention enable the network to effect adjustable performance by increasing or decreasing the value of $N_d$ in use in the system/cell. The SER of DTX/ACK/NACK can be decreased by increasing $N_d$ as seen above. This is seen to be a full and total solution to the "CQI only/CQI+ACK/NACK" problem noted in background above. And also for small $N_{CQI}$, there is low decoding complexity. It follows then that for large $N_{CQI}$, maximum likelihood decoding will be more complex and may not be practical for very large $N_{CQI}$. This can be resolved somewhat by employing in the e-Node B 12 a soft-output decoder for the channel code. The output of this decoder (for $N_d$ bits) is then used to determine the most probable DTX/ACK/NACK symbol.

This performance may be further fine-tuned by recognizing that the NACK to ACK error is more severe than the ACK to NACK error, since in the former the missing data is not re-transmitted but in the latter the data is not needed but re-transmitted anyway so only a bit of bandwidth is wasted rather than information lost. The probability of a NACK to ACK error can be decreased by using a threshold after the decoder (such as a comparator or other logic circuitry that passes a decoder output only if a value exceeds a threshold). A maximum likelihood ML decoder correlates the received signal with all possible transmitted sequences, which gives a reliability value for each transmitted sequence. Using a comparator to compare the reliability value for an ACK decision to one threshold and a reliability value for a NACK decision to some other threshold, for the same set of CQI bits, allows the decoder to make the ACK decision only if the ACK reliability is clearly stronger than the reliability of the corresponding NACK. Adjusting these different thresholds can be used to adjust the NACK to ACK probability relative to the ACK to NACK probability to reflect the different severity of those different errors. The ability to make such an adjustment may be more important in certain contexts and less so in others.

Figure 8:
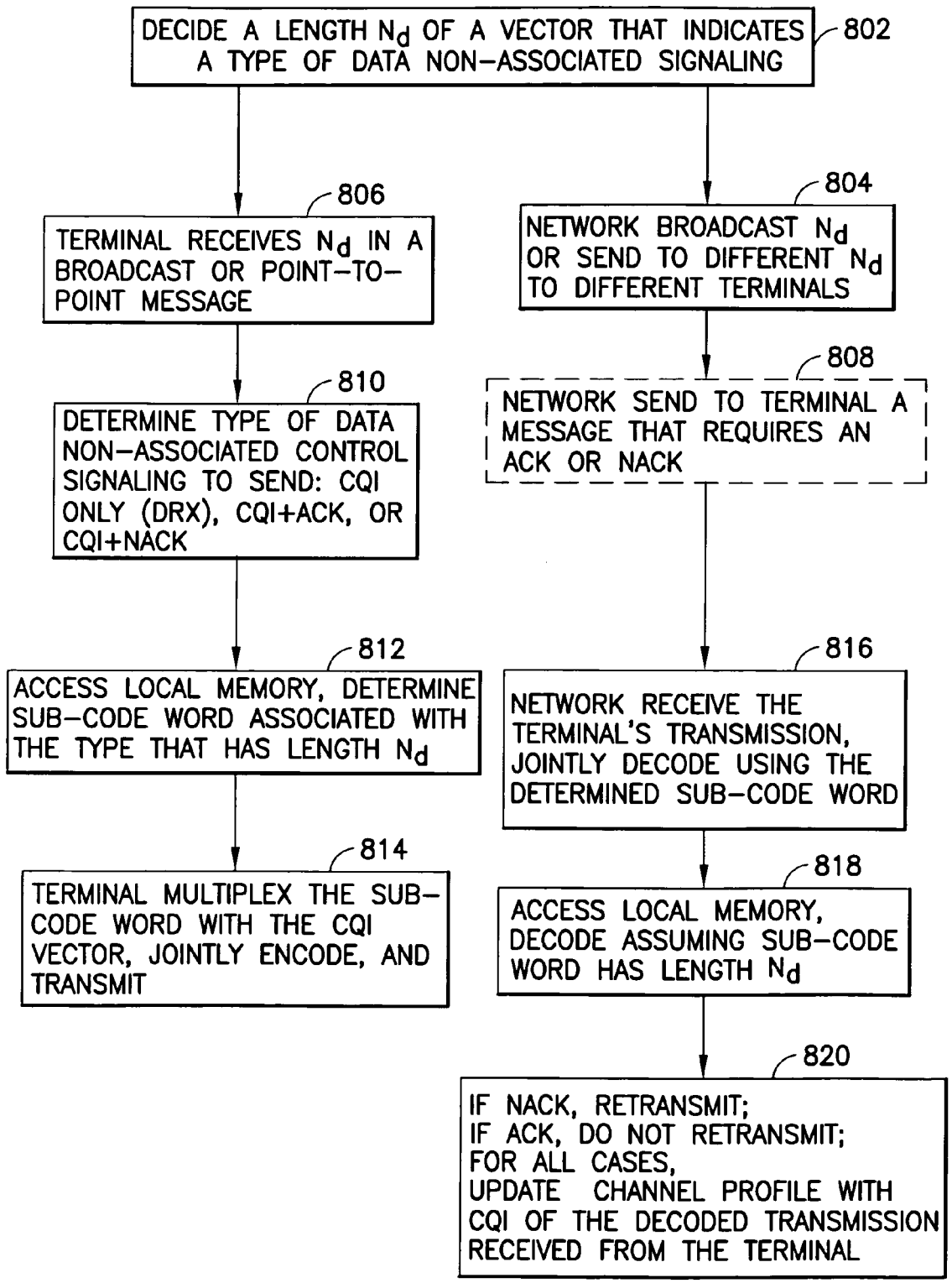
FIG. 8 is a process flow diagram showing actions and functions according to an embodiment of the invention.

FIG. 8 is a process flow diagram showing an exemplary embodiment of how the invention might be practiced, which may also represent particular functions of circuitry of an integrated circuit adapted according the invention described herein. At block 802 is decided an integer length $N_d$, preferably at least three but at minimum two for a ternary decision, of a vector that indicates a decision on what type of data non-associated control signalling is to be sent. At the network side of the wireless communication, the network decides at block 802 autonomously and at block 804 either broadcasts that length in the cell or sends different lengths $N_d$ to different mobile terminals/UEs that are simultaneously in the cell. At block 806 a particular terminal determines the length by receiving the broadcast message or point to point message sent at block 804.

At block 808 the network then sends to the particular terminal a message that requires an acknowledgement or a negative acknowledgement. This is optional in that the terminal can send CQI at regular intervals, and sometimes without an ACK or NACK as detailed above. At block 810, the terminal determines the type of data non-associated control signalling it will send: if there was no transmission at block 808 then it will send control signalling of the type CQI-only; if it received the transmission sent at block 808 it will send control signalling of the type CQI+ACK; and if it did not properly receive (e.g., decode failure) the transmission sent at block 808 it will be send control signalling of the type CQI+NACK. These are only exemplary and other types may be used in place of or in addition to those three.

At block 812 the terminal accesses its local memory and determines the sub-code word associated in its memory with the determined type from block 810 and the determined $N_d$ from blocks 802 and 806. This may be stored as a lookup table as shown in FIGS. 3-4, as an algorithm to generate those sub-code words, or as the sequence generators (lookup table or algorithm) as in FIG. 5, for example. The terminal then measures the channel quality of the channel over which the transmission from block 808 arrived (one or more channels) or measures the channel it is tasked to measure on a periodic basis if the control signalling type is CQI-only, and compiles a channel quality indicator of length $N_{CQI}$ which it then multiplexes with the CQI vector of length $N_{CQI}$. This multiplexed vector is then jointly encoded with a channel codeword and transmitted to the network, all of which is at block 814.

Returning to the network side, the network at block 816 receives the terminal's transmission from block 814, and jointly decodes the channel codeword and the CQI vector and the sub-code word of length $N_d$. The network element such as the e-Node B knows the length $N_d$ from blocks 802 and 804, and knows at block 818 from its local memory a limited set of sub-code words that the received sub-codeword of length $N_d$ could be from its local memory, which stores the same substantive information as that of the terminal at block 812. At block 820, the network element updates its channel profile for the channel in question using the CQI vector received at block 816, and if the type is CQI+NACK it also re-transmits the data from block 808 and if the type is CQI+ACK it does not retransmit but dumps that message/data from its buffer.

While the above examples are in the context of distinguishing data non-associated control signalling of the types DTX, ACK and NACK in either single channel or MIMO implementations, these teachings are not limited only to distinguishing among those three types. For example, if DTX is not an option in a particular network (e.g., CQI may be sent only with data, ACK or NACK), or is not included in implementing these teachings for the ACK and NACK signalling, then only the two control signalling types CQI+ACK and CQI+NACK may be mapped to the different subcodes as detailed above, and the case of CQI only without ACK or NACK may be either handled differently or not an allowed option in a particular network for data non-associated control signalling. As with the ternary decision detailed above, handling of the binary ACK/NACK decision can be extended also for multiple channels. Two channel implementation for example would impose a four-way decision from among {ACK&ACK, ACK&NACK, NACK&ACK, NACK&NACK} that is input to the mapper 206 so as to output the proper subcode for joint encoding.

So according to an embodiment of the invention there is an apparatus, a method and a computer program that operate, from the perspective of the UE for example, to determine from a received message a length $N_d$, preferably at least length 3, of a vector that indicates a type of data non-associated control signalling, to determine a channel quality vector and a vector of the determined length $N_d$, to multiplex and jointly encode those two vectors and transmit them. And according to an embodiment of the invention there is an apparatus, a method and a computer program that operate, from the perspective of the network element for example, to determine a length $N_d$, preferably at least length 3, of a vector that indicates a type of data non-associated control signalling, to send an indicator of the determined length $N_d$ to at least one user equipment, to receive from the user equipment a message, and to decode the message using a sub-codeword stored in memory of the determined length $N_d$, and to determine from the sub-code word what type of data non-associated control signalling is in the message received from the user equipment.

For the aspects of this invention related to the network side of the wireless communication, embodiments of this invention may be implemented by computer software executable by a data processor of the Node B 12, such as the processor 12A shown, or by hardware, or by a combination of software and hardware. For the aspects of this invention related to the user equipment side of the wireless communication, embodiments of this invention may be implemented by computer software executable by a data processor of the UE 10, such as the processor 10A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The various blocks shown in FIG. 8 may be viewed as method steps, and/or as operations that result from operation of computer program code, and/or as a plurality of coupled logic circuit elements constructed to carry out the associated function(s).

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

For example, while the exemplary embodiments have been described above in the context of the EUTRAN (UTRAN-LTE) system, it should be appreciated that the exemplary embodiments of this invention are not limited for use with only this one particular type of wireless communication system, and that they may be used to advantage in other wireless communication systems such as for example UTRAN, GSM and perhaps WLAN.

Further, the various names used for the described parameters (e.g., DTX, ACK, NACK etc.) are not intended to be limiting in any respect, as these parameters may be identified by any suitable names. Further, the formulas and expressions that use these various parameters may differ from those expressly disclosed herein.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method, comprising:
    determining, by an apparatus, a length $N_d$ of a vector that indicates a type of data non-associated control signaling, where $N_d$ is an integer at least equal to two;
    decoding, by the apparatus, a received message using a sub-code word, stored in a memory, having the determined length $N_d$; and
    determining, by the apparatus, from the sub-code word what type of data non-associated control signaling is in the received message;
    wherein the type of data non-associated control signaling is selected from the group comprising channel quality indicator plus acknowledgement, channel quality indicator plus negative acknowledgement, and channel quality indicator without an acknowledgement or a negative acknowledgement; and
    wherein the method further comprises broadcasting, by the apparatus, an indication of the determined length $N_d$.

2. The method according to claim 1, wherein decoding comprises jointly decoding from the message a channel quality indicator and an acknowledgement or negative acknowledgement.

3. The method according to claim 2, wherein the length $N_d$ is determined to achieve an error performance such that increasing the length deteriorates error performance of the channel quality indicator and increases error performance of the acknowledgment or negative acknowledgement.

4. A method, comprising:
    determining, by an apparatus, a length $N_d$ of a vector that indicates a type of data non-associated control signaling, where $N_d$ is an integer at least equal to two;
    decoding, by the apparatus, a received message using a sub-code word, stored in a memory, having the determined length $N_d$; and
    determining, by the apparatus, from the sub-code word what type of data non-associated control signaling is in the received message;
    wherein the type of data non-associated control signaling is selected from the group comprising channel quality indicator plus acknowledgement, channel quality indicator plus negative acknowledgement, and channel quality indicator without an acknowledgement or a negative acknowledgement; and
    wherein determining the length $N_d$ is individualized for a particular user equipment, the method further comprising sending, by the apparatus, to the particular user equipment an indication of the individualized length $N_d$ in a point to point message.

5. A method, comprising:
    determining, by an apparatus, a length $N_d$ of a vector that indicates a type of data non-associated control signaling, where $N_d$ is an integer at least equal to two;

decoding, by the apparatus, a received message using a sub-code word, stored in a memory, having the determined length $N_d$; and determining, by the apparatus, from the sub-code word what type of data non-associated control signaling is in the received message;

wherein the message is received in response to sending a first message that requires an acknowledgement or a negative acknowledgement; and wherein decoding comprises jointly decoding from the received message a channel quality indicator and the sub-code word of length $N_d$; the method further comprising updating, by the apparatus, a channel profile for a channel over which the first message was sent using the decoded channel quality indicator.

6. The method according to claim 5 executed by a wireless network access node; further comprising for the case that the type of data non-associated control signaling is channel quality indicator plus negative acknowledgement, resending the first message in response to decoding the negative acknowledgement.

7. An apparatus, comprising:
a memory comprising program instructions; and
a processor configured, in response to execution of the program instructions, to cause the apparatus:
to determine a length $N_d$ of a vector that indicates a type of data non-associated control signaling, where $N_d$ is an integer at least equal to two;
to decode a received message using a sub-code word, stored in a memory, having the determined length $N_d$; and
to determine from the sub-code word what type of data non-associated control signaling is in the received message;
wherein the type of data non-associated control signaling is selected from the group comprising channel quality indicator plus acknowledgement, channel quality indicator plus negative acknowledgement, and channel quality indicator without an acknowledgement or a negative acknowledgement, and the received message comprises data non-associated control signaling; and
wherein the processor is further configured, in response to execution of the program instructions, to cause the apparatus to broadcast an indication of the determined length $N_d$.

8. The apparatus according to claim 7, wherein the decoder is configured to jointly decode from the message a channel quality indicator and an acknowledgement or negative acknowledgement.

9. The apparatus according to claim 8, wherein processor is configured to determine the length $N_d$ to achieve an error performance such that increasing the length deteriorates error performance of the channel quality indicator and increases error performance of the acknowledgment or negative acknowledgement.

10. An apparatus comprising:
a memory comprising program instructions; and
a processor configured, in response to execution of the program instructions, to cause the apparatus:
to determine a length $N_d$ of a vector that indicates a type of data non-associated control signaling, where $N_d$ is an integer at least equal to two;
to decode a received message using a sub-code word, stored in a memory, having the determined length $N_d$; and
to determine from the sub-code word what type of data non-associated control signaling is in the received message;
wherein the type of data non-associated control signaling is selected from the group comprising channel quality indicator plus acknowledgement, channel quality indicator plus negative acknowledgement, and channel quality indicator without an acknowledgement or a negative acknowledgement, and the received message comprises data non-associated control signaling; and
wherein the processor is configured, in response to execution of the program instructions, to cause the apparatus to determine the length $N_d$ individualized for a particular user equipment, and to send to the particular user equipment an indication of the individualized length $N_d$ in a point to point message.

11. An apparatus comprising:
a memory comprising program instructions; and
a processor configured, in response to execution of the program instructions, to cause the apparatus:
to determine a length $N_d$ of a vector that indicates a type of data non-associated control signaling, where $N_d$ is an integer at least equal to two;
to decode a received message using a sub-code word, stored in a memory, having the determined length $N_d$; and
to determine from the sub-code word what type of data non-associated control signaling is in the received message;
wherein the message is received in response to the apparatus sending a first message that requires an acknowledgement or a negative acknowledgement;
wherein decoding comprises jointly decoding from the received message a channel quality indicator and the sub-code word of length $N_d$; and
wherein the processor is further configured, in response to execution of the program instructions, to cause the apparatus to update a channel profile for a channel over which the first message was sent using the decoded channel quality indicator.

12. The apparatus according to claim 11, wherein the apparatus comprises a network access node; wherein the processor is further configured, in response to execution of the program instructions, for case that the type of data non-associated control signaling is channel quality indicator plus negative acknowledgement, to cause the apparatus to resend the first message in response to decoding the negative acknowledgement.

13. A method comprising:
receiving, by an apparatus, an indication of a length $N_d$ of a vector that indicates a type of data non-associated control signaling, where $N_d$ is an integer at least equal to two;
determining, by the apparatus, a channel quality vector and a vector of the length $N_d$ that indicates a type of data non-associated control signaling; and
multiplexing and jointly encoding, by the apparatus, the vector of length $N_d$ with the channel quality vector;
wherein the indication of the length $N_d$ is received in a broadcast message, the method further comprising transmitting, by the apparatus, the multiplexed and jointly encoded vector of length $N_d$ with the channel quality vector as data non-associated control signaling.

14. The method according to claim 13, wherein determining the vector of the length $N_d$ comprises:
determining a type of data non-associated control signaling to send, the type selected from the group comprising channel quality indicator plus acknowledgement, channel quality indicator plus negative acknowledgement, and channel quality indicator without acknowledgment or negative acknowledgement; and selecting from a local memory a sub-codeword for the determined type having the indicated length $N_d$; wherein the vector of the length $N_d$ is the selected sub-codeword.

15. The method according to claim 14, wherein the group comprising the types of data non-associated control signaling to send comprises channel quality indicator plus acknowledgement per channel, and channel quality indicator plus negative acknowledgement per channel, for more than a single channel.

16. A method comprising:
receiving, by an apparatus, an indication of a length $N_d$ of a vector that indicates a type of data non-associated control signaling, where $N_d$ is an integer at least equal to two;
determining, by the apparatus, a channel quality vector and a vector of the length $N_d$ that indicates a type of data non-associated control signaling; and
multiplexing and jointly encoding, by the apparatus, the vector of length $N_d$ with the channel quality vector;
wherein the indication of the length $N_d$ is received in a point to point message, the method further comprising transmitting, by the apparatus, the multiplexed and jointly encoded vector of length $N_d$ with the channel quality vector as data non-associated control signaling.

17. A method comprising:
receiving, by an apparatus, an indication of a length $N_d$ of a vector that indicates a type of data non-associated control signaling, where $N_d$ is an integer at least equal to two;
determining, by the apparatus, a channel quality vector and a vector of the length $N_d$ that indicates a type of data non-associated control signaling; and
multiplexing and jointly encoding by the apparatus, the vector of length $N_d$ with the channel quality vector;
wherein determining the vector of the length $N_d$ comprises:
  determining a type of data non-associated control signaling to send, the type selected from the group comprising channel quality indicator plus acknowledgement, channel quality indicator plus negative acknowledgement, and channel quality indicator without acknowledgment or negative acknowledgement; and
  selecting from a local memory a sub-codeword for the determined type having the indicated length $N_d$; wherein the vector of the length $N_d$ is the selected sub-codeword;
wherein the channel quality vector is determined from measuring a channel over which data is received, and wherein the determined type of data non-associated control signaling to send is selected as channel quality plus acknowledgement for the case that the data was correctly received and is selected as channel quality plus negative acknowledgement for the case where the data was not correctly received.

18. An apparatus, comprising:
a memory comprising program instructions; and
a processor configured, in response to execution of the program instructions, to cause the apparatus:
to determine a channel quality vector and to determine, from a received indication of a length $N_d$, a vector of the length $N_d$ that indicates a type of data non-associated control signaling, where $N_d$ is an integer at least equal to two; and
to multiplex and jointly encode the vector of length $N_d$ with the channel quality vector;
to receive the indication of the length $N_d$ in a broadcast message; and
to transmit the multiplexed and jointly encoded vector of length $N_d$ with the channel quality vector as data non-associated control signaling.

19. The apparatus according to claim 18, wherein the processor is configured, in response to execution of the program instructions, to cause the apparatus to determine the vector of the length $N_d$ by:
determining a type of data non-associated control signaling to send, the type selected from the group comprising channel quality indicator plus acknowledgement, channel quality indicator plus negative acknowledgement, and channel quality indicator without acknowledgment or negative acknowledgement; and
selecting from a local memory a sub-codeword for the determined type having the indicated length $N_d$; wherein the vector of the length $N_d$ is the selected sub-codeword.

20. The apparatus according to claim 19, wherein the group comprising the types of data non-associated control signaling to send comprises channel quality indicator plus acknowledgement per channel, and channel quality indicator plus negative acknowledgement per channel, for more than a single channel.

21. An apparatus, comprising:
a memory comprising program instructions; and
a processor configured, in response to execution of the program instructions, to cause the apparatus:
to determine a channel quality vector and to determine, from a received indication of a length $N_d$, a vector of the length $N_d$ that indicates a type of data non-associated control signaling, where $N_d$ is an integer at least equal to two; and
to multiplex and jointly encode the vector of length $N_d$ with the channel quality vector;
to receive the indication of the length $N_d$ in a point to point message; and
to transmit the multiplexed and jointly encoded vector of length $N_d$ with the channel quality vector as data non-associated control signaling.

22. An apparatus, comprising:
a memory comprising program instructions; and
a processor configured, in response to execution of the program instructions, to cause the apparatus:
to determine a channel quality vector and to determine, from a received indication of a length $N_d$, a vector of the length $N_d$ that indicates a type of data non-associated control signaling, where $N_d$, is an integer at least equal to two; and
to multiplex and jointly encode the vector of length $N_d$ with the channel quality vector;
to determine the vector of the length $N_d$ by:
  determining a type of data non-associated control signaling to send, the type selected from the group comprising channel quality indicator plus acknowledgement, channel quality indicator plus negative acknowledgement, and channel quality indicator without acknowledgment or negative acknowledgement; and
  selecting from the memory a sub-codeword for the determined type having the indicated length $N_d$; wherein the vector of the length $N_d$ is the selected sub-codeword;
to determine the channel quality vector from measuring a channel over which data is received; and to determine the type of data non-associated control signaling to send by selecting the type as channel quality plus acknowledgement for the case that the data was correctly received, and by selecting the type as channel quality plus negative acknowledgement for the case where the data was not correctly received.

23. A memory storing a program of computer readable instructions that when executed by a processor result in actions that comprise:

receiving an indication of a length $N_d$ of a vector that indicates a type of data non-associated control signaling, where $N_d$ is an integer at least equal to two;

determining a channel quality vector and a vector of the length $N_d$ that indicates a type of data non-associated control signaling; and multiplexing and jointly encoding the vector of length $N_d$ with the channel quality vector;

wherein the indication of the length $N_d$ is received in one of a broadcast message and a point to point message, the actions further comprising transmitting the multiplexed and jointly encoded vector of length $N_d$ with the channel quality vector as data non-associated control signaling.

* * * * *